United States Patent [19]

Mehner

[11] Patent Number: 5,727,185
[45] Date of Patent: Mar. 10, 1998

[54] MEMORY ALLOCATION METHOD FOR ALLOCATING TWO LOGICAL STORE AREAS TO A FREE STORE, THAT IS ONE COMMON PHYSICAL STORE AREA OF A COMPUTER

[75] Inventor: Thomas Mehner, Markt Schwaben, Germany

[73] Assignee: Siemens Aktiengesellschaft, Munich, Germany

[21] Appl. No.: 795,963

[22] Filed: Feb. 6, 1997

Related U.S. Application Data

[63] Continuation of Ser. No. 374,665, filed as PCT/DE93/00642 Jul. 21, 1993, published as WO94/02897 Feb. 3, 1994, abandoned.

[30] Foreign Application Priority Data

Jul. 21, 1992 [DE] Germany .................. 42 24 080.8

[51] Int. Cl.⁶ .................. G06F 12/00; G06F 13/00
[52] U.S. Cl. .................. 395/497.01; 364/DIG. 1; 364/243; 364/254.7; 395/497.02; 395/412; 395/413
[58] Field of Search .................. 395/497.01, 497.02, 395/412, 413; 364/DIG. 1, 243, 254.7

[56] References Cited

U.S. PATENT DOCUMENTS

| 4,084,225 | 4/1978 | Anderson et al. | 395/497.01 |
| 4,445,170 | 4/1984 | Hughes et al. | 395/497.01 |
| 5,159,678 | 10/1992 | Wengelski et al. | 395/650 |

OTHER PUBLICATIONS

"A Weighted Buddy Method for Dynamic Storage Allocation", Kenneth K. Shen et al, Communications of the ACM, vol. 17, No. 10, Oct. 1974, pp. 558–562.

"Mainframe Memory For Microcomputers", J.F. Stockton, Computer Design, vol. 21, No. 1, Jan. 1982, pp. 139–147.

386 DX Programmer's Reference Manual 1989, INTEL "Kapitel", chapter 5, Memory Management; chapter 6 Protection; 26 pages, double sided.

"The Art of Computer Programming", D.E. Knuth, vol. 1, Addison-Wesley, Reading Mass., 1986, 2nd edition, 1973, pp. 435–441.

(List continued on next page.)

*Primary Examiner*—Tod R. Swann
*Assistant Examiner*—Tuan V. Thai
*Attorney, Agent, or Firm*—Hill, Steadman & Simpson

[57] ABSTRACT

A method for dynamic management of a free store of a computer system, the free store being subdivided into at least two logical store areas with different access characteristics. Each logical store area of the at least two logical stores is separately managed. A segment is assigned size to a logical store area of the free store, the segment size corresponding to a maximum size described as a maximum in a buddy algorithm. In the event of a store request regarding a first logical store area of the at least two logical store areas, a segment from the free store is assigned to the first logical store area if there is no store segment of sufficient size available. In the event of a store request regarding a second logical store area of the at least two logical store areas, a segment from the free store which has not been assigned to any other logical store area is assigned to the second logical store area and which is adjacent to already assigned segments if no store segment of sufficient size is available. If it is no longer possible to satisfy a store request from a logical store area of the at least two logical store areas, which requires an assignment from the free store, since the free store has already been completely assigned, store managements of the other store areas are evaluated via a store management of this store area to ascertain whether there are other segments in the other store areas with the maximum size. If this condition is met, it takes over such other segment from a respective other store area and the other segment is assigned to this store area.

7 Claims, 2 Drawing Sheets

OTHER PUBLICATIONS

386 DX Programmer's Reference manual 1990, INTEL the Microcomputer Company, "Microprocessors", chapter 4, pp. 202–211.

"An Efficient Database Storage Structure for Large Dynamic Objects", Alexandros Biliris, Eighth International Conference on Data Engineering, 2 Feb. 1992, pp. 301–308.

"Space Efficient Parallel Buddy Memory Management", Proceedings. ICCI '92, Fourth International Conference on Computing and Information, pp. 128–132, May 28, 1992.

MEMORY ALLOCATION METHOD FOR ALLOCATING TWO LOGICAL STORE AREAS TO A FREE STORE, THAT IS ONE COMMON PHYSICAL STORE AREA OF A COMPUTER

This is a continuation of application Ser. No. 08/374,665, filed as PCT/DE93/00642 Jul. 21, 1993, published as WO94/02897 Feb. 3, 1994, abandoned.

BACKGROUND OF THE INVENTION

The management of the free store of a computer can be performed in its operating systems in various ways. Two criteria essentially determine the selection of the algorithm on which store management is based. On the one hand, the store management may be optimized for small limited main stores. That is to say only little storage space wastage is acceptable and an operationally occurring storage fragmentation may result in relatively high access times to the store.

On the other hand, store management may be optimized for real-time applications. In this case it is particularly important that stores can be quickly found and assigned to processes requesting them. A higher storage space wastage is acceptable and storage fragmentation must not impede the linking of returned store segments.

In the case of telecommunication applications with high security requirements and very critical time conditions, the second route is often chosen. In particular when selecting a store management system for a telecommunications system, the following criteria should be observed:

Storage space wastage up to 50% is acceptable

Storage fragmentation must not result in poorer run-time behavior or increasing storage demand even in the case of a long system run time and even in the case of large fluctuations storage demand (for example due to object-oriented programing). That is to say that the fusing together of returned store areas is to be maximized.

Real-time requirements must be met. That is to say that the operations of requesting and returning stores must exhibit high dynamic efficiency. In particular, they must not include search operations which take longer with an increasing number of managed store fragments.

Furthermore, overall garbage collection routines, which require the system to be stopped for as long as they take to execute, cannot be used.

Telecommunications applications require the possibility of stepped resettability (i.e. reinitialization of data and processes). For this purpose it is necessary to manage a number of separate logical store areas which differ in the type of access on the same physical store without additional storage wastage.

To allow for the high security requirements, the effect of errors in the user software must be restrictable to the greatest extent. Therefore, in particular the store protection mechanisms, as provided by the processors in the computer, must be used as far as possible, without endangering the run-time efficiency of the program.

On account of these restricting criteria, the only system which comes into consideration as a basis for store management in a telecommunications application is the buddy system, as described in Knuth, D. E.: The Art of Computer Programming, Vol. 1, Addison-Wesley, Reading, Mass., 1986, 2nd ed., 1973.

According to the buddy algorithm, stores are allocated only in so-called admissible sizes. Every store size requested by a process is rounded up to the next-largest admissible size. For each admissible size there exists an unordered list of free fragments. In the case of store requests with a particular size, this list is first checked to ascertain whether there is a free element of the next admissible size available. If this is the case, it is assigned to the process requesting it. If this is not the case, a free element of the next-largest free size is iteratively divided. This operation takes place until an element which corresponds in its size to the next-largest admissible store size in comparison with the store size requested is obtained. This is then assigned to the process requesting it.

If the buddy algorithm can no longer find a suitable element of the corresponding size for the process requesting it, or cannot produce such an element by dividing from other elements, it occupies an element of maximum size from the store area still free and, by division, produces an element which corresponds to the desired admissible size.

When returning a store fragment which was requested by a process, the address of its neighboring store fragment is calculated (depending on the admissible store sizes). The segment is inserted and, if the neighboring fragment is free, the two are fused together and entered in the list under the size obtained after the fusion. The fusing operation is continued for as long as there are still free store fragments of corresponding size available or until the largest possible admissible store segment size is reached.

So far there is no known method of store management which caters for the requirements for high run-time efficiency and different access/resetting conditions for different data and processes.

SUMMARY OF THE INVENTION

The object on which the invention is based is to provide a method which allows different access and resetting conditions for different data and processes and which combines high run-time efficiency with great access security.

This method is achieved by a method for the dynamic management of a free store of a computer, the free store being designed for subdivision into at least two logical store areas with different access characteristics. The free store is subdivided into segments on the basis of the buddy algorithm. Separate management is carried out for each logical store area. The segment size which is assigned to a logical store area from the free store corresponds to the segment size of the maximum size described as the maximum in the buddy algorithm. In the event of a store request to a first logical store area, the latter is assigned a segment from the free store if there is no store segment of sufficient size available. In the event of a store request from a second logical store area, the latter is assigned a segment from the free store which has not been assigned to any other logical store area and which is adjacent to already assigned segments if no store segment of sufficient size is available. If it is no longer possible to cater for a store request from a logical store area which requires an assignment from the free store, since the free store has already been completely assigned, the store management of this store area checks the store managements of the other store areas to ascertain whether there are segments there with the maximum size and, if this condition is met, takes over such a segment from there, which is then assigned.

It is particularly advantageous that, for different access and resetting conditions, the method according to the invention defines separate logical store areas, which are handled with separate buddy management algorithms.

It is particularly favorable when the method according to the invention is used that, after clearing a logical store area, the latter is retained in its size, since then no gaps can occur in the free store.

It is advantageous in the method according to the invention to provide a segment protection for those segments which are allowed in the buddy algorithm as largest admissible store segments, as soon as they are assigned.

This has the following advantages:

only one segment size has to be managed;

only reassignment of entire segments to a store area makes demands on the store protection, which is not so in the case of individual storage space requests or returns (run-time efficient!);

the generally restricted number of protectable segments is adequate even for large stores.

In spite of this low demand, the effect is achieved that processes which access a segment or access a subunit of a segment cannot write beyond this segment size, and thus destroy data in other segments or even other logical store areas, if an address is erroneously calculated.

Furthermore, if a segment protection is carried out, it is advantageous in the method according to the invention to enter the data which identify this segment protection into tables, or lists, or store areas provided for the purpose, since they can then be found quickly and be managed easily.

Features for the method according to the invention which concern protection and are important, because they can be altered and are identifying, are the initial address, the segment length and the type of access to a segment.

The method according to the invention can use a processor REC such as an "80386" microprocessor, since it provides segment protection for particular store segments of the physical free store.

A microprocessor REC, such as a second generation type microprocessor ("80286"), can be used for the method according to the invention to manage the management data for the store segment protection in the GDT (Global Descriptor Table) and the LDT (Local Descriptor Table), since an access of the processor to these tables can take place particularly quickly and simply.

The method according to the invention allows store segment lengths for the buddy algorithm which are in the range from $2^5$ to $2^{16}$ k. This has the consequence that a small storage demand is required for management of the segment data and that the calculations for the division and the fusing of the segments can be efficiently performed dynamically.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures of which like reference numerals identify like elements, and in which:

DESCRIPTION OF THE PREFERRED EMBODIMENTS

Figure 1:
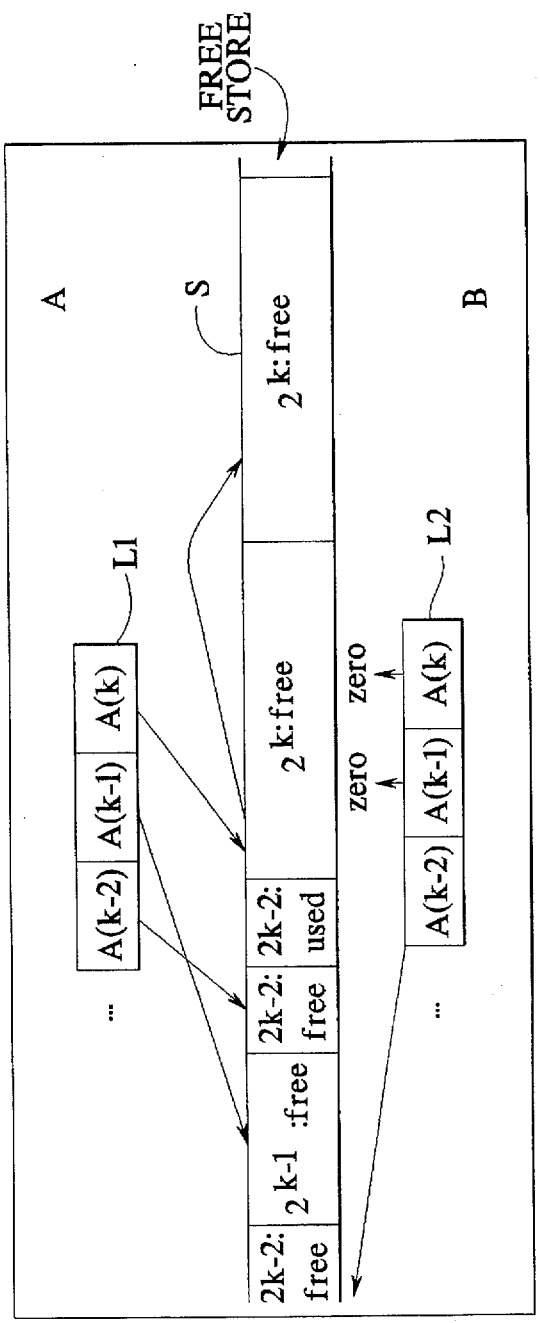
FIGS. 1 and 2 show snapshots from the operation of a store management which operates by a method according to the invention, in which two logical store areas A and B are managed by the buddy algorithm.
Figure 5:
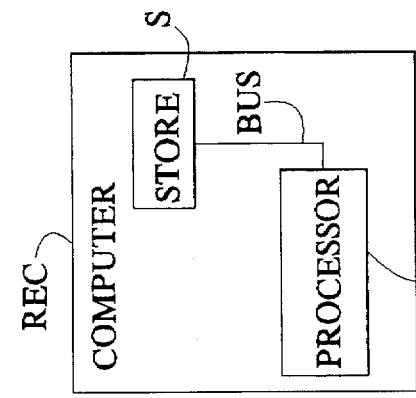
FIG. 5 is a block diagram of a computer with a memory store for use with the present invention.

FIG. 1 shows a snapshot from the operation of a store management according to the invention, which acts on two logical store areas. The physical store S of a computer REC is managed by the present invention (see FIG. 5).

This may be a normal computer, or a telecommunications computer. The store segments available for the logical store area A are given in the list L1. The store segments available for the logical store area B are given in the list L2.

As can be clearly seen in FIG. 1, the available store S has been divided by the buddy algorithm into subsegments of different sizes. These subsegments are identified by their size and by their occupancy.

Free means free store segment and used means assigned store segment. The size is denoted by powers of two of K.

In the list L1 for the store area A there are elements of sizes k–2, k–1 and k. The list refers to the addresses at the beginning of the respective segments in the physical store S. In this case, reference is always made to the first element in the store and, if there is a further element of the same size present, from this element there is reference to the beginning of the next one, as can be clearly seen in FIG. 1 for the logical store area A and for the size $2^k$. Since the maximum admissible size for the buddy algorithm is defined here as k, the two adjacent free store segments with the size $2^k$ are not fused together.

In the list L2 for the logical store area B, elements of the sizes k–2, k–1 and k are also given. However, only segments of the size k–2 are available to the logical store area B. The arrows of the two other segments k–1 and k point to zero. This means that store requests for the logical store area B which require larger elements than k–2 cannot be met at the present time from the already assigned store area. In this case, for B it would be necessary for a new area of the size $2^k$ to be occupied on the existing physical store S.

Figure 2:
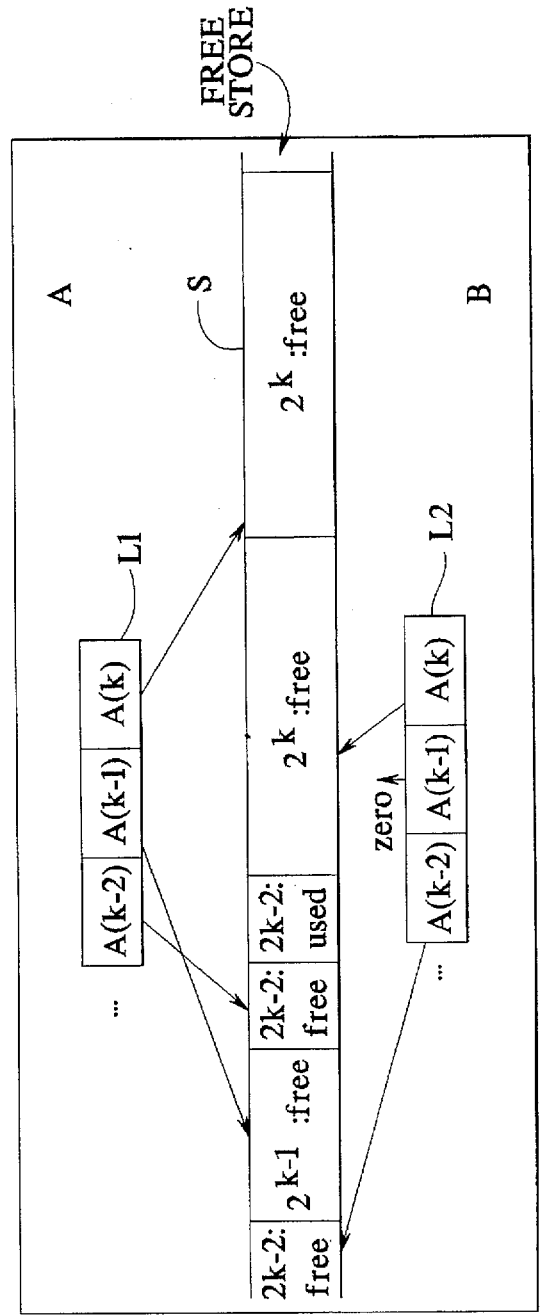

FIG. 2 shows a snapshot from the operation of a store management according to the invention, which was taken after the time of the snapshot of the version represented in FIG. 1. The reference symbols used are equivalent. It is assumed that the store management according to the invention is in operation and that there exists a state as represented in FIG. 1.

A store request from the logical store area B with a store size k now takes place. Since, as can be seen from list L2 in FIG. 1, no segment of the size k is available for the logical store area B, a new store segment would have to be delimited from the store S and assigned to the store area B. However, this is not the case here, since the physical store S has already been assigned completely to the two logical store areas A and B. The method according to the invention now provides that the buddy management operations of the other logical store areas are searched through and checked to ascertain whether an element of the desired largest admissible size is to be found there. The search reaches its objective here, for example, with the logical store area A.

The method according to the invention then provides that the free store segments present there are used for covering the demand in the store area B. This takes place by the start address of the store area with the size k in the list L1 being transferred to the list L2 and being assigned there to the store area B. In the list L1, allowance is made for this situation by the pointer for the elements of the size k that refer to the start address of the element behind the element which is given in the list L2.

If no element of the size k were requested from the store area B, but one is requested which is larger than k–2 and smaller or equal to k, the buddy algorithm would divide the element of the size k until the next-largest size than that requested is reached by the dividing operation. This element is then assigned to the store-requesting process.

Figure 3:
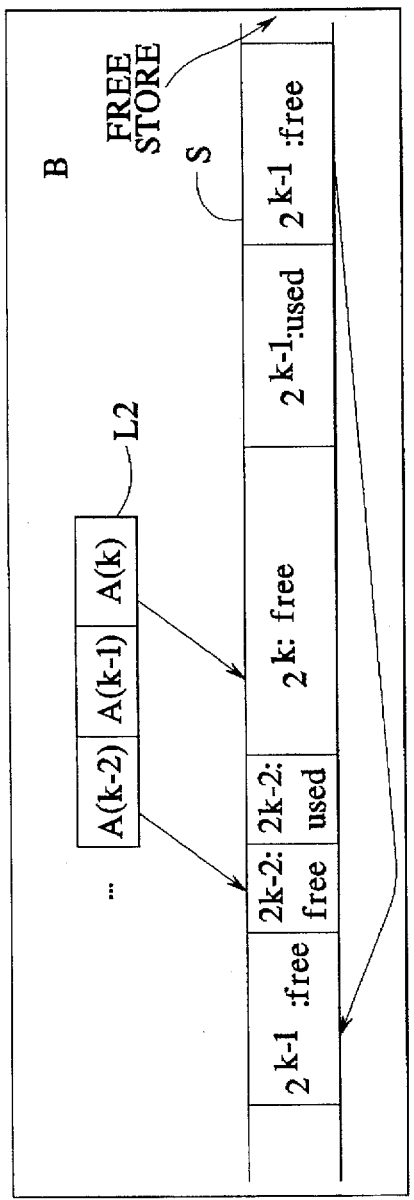
FIGS. 3 and 4 show snapshots from the operation of a store management according to the invention, which illustrate the operations during resetting of a logical store area.

FIG. 3 shows a snapshot of the logical store area B, which is managed by the method according to the invention. The reference symbols are analogous to those used in FIGS. 1 and 2. From the list L2 for the store area B, reference is made to store segments of the sizes k–2, k and k–1, as represented by arrows. These arrows point to the initial addresses of the corresponding store segments in the physical store S of the computer. Store segments of the same size are linked to one another, i.e. there is reference from the end of that element referred to from the list to the initial address of the next element of the same size in the physical store S.

An example of an application for the definition of logical store areas may be a telecommunications application. In the logical store area A there would then be recorded here the user-relevant data of the subscribers and in the store area B there would be given the current connection data. As provided by the method according to the invention, the store segments of the size k given in the lists L may also be provided with a corresponding access protection. This has the consequence that, in the event of a miscalculation of the addresses by the user software, it is not possible to overwrite beyond the size of a protected segment into other, neighboring segments. This ensures greater operational security of the entire application software.

Figure 4:
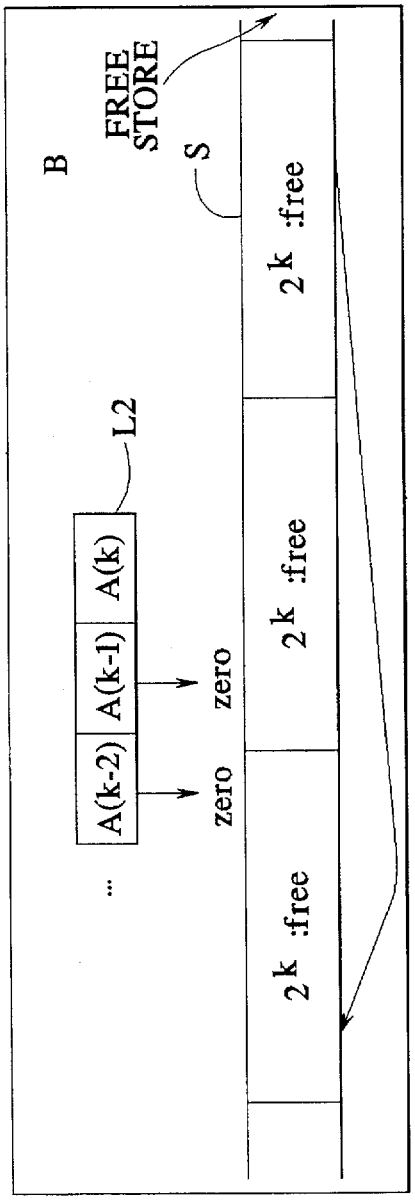

FIG. 4 shows a snapshot of the logical store area B and of the physical store S, which was taken after the time of the version represented in FIG. 3.

The logical store area B was reset in FIG. 4 in the manner of the method according to the invention. As can be clearly seen, there are now only elements of the maximum size K, which are joined to one another as segments in the store S. The user-relevant data of a telecommunications system, for example, are not affected by this resetting operation. They continue to exist in the same form as that in which they existed before resetting of the logical store area B on the physical store S in the logical store area A. As a consequence of the resetting operation, in the list L2 there now only exist references to store segments of the size k. The sizes k–2 and k–1 are referred to zero. This means that there are no elements of these sizes present. The segments of the size k refer mutually to one another, as already discussed before in FIG. 3.

This resetting procedure in the method according to the invention has the advantage that no gaps occur in the physical store S after resetting, so that the method according to the invention can continue to transfer store segments from one logical store area to the other logical store area if this is required by the corresponding preconditions.

The invention is not limited to the particular details of the method depicted and other modifications and applications are contemplated. Certain other changes may be made in the above described method without departing from the true spirit and scope of the invention herein involved. It is intended, therefore, that the subject matter in the above depiction shall be interpreted as illustrative and not in a limiting sense.

What is claimed is:

1. A method for dynamic management of a free store of a computer system, the free store being subdivided into at least two logical store areas with different access characteristics, comprising the steps of:
   a) subdividing the free store into segments on the basis of a buddy algorithm;
   b) separately managing each logical store area of the at least two logical stores;
   c) assigning a segment size to a logical store area of the free store, said segment size corresponding to a maximum size described as a maximum in a buddy algorithm;
   d) in the event of a store request regarding a first logical store area of the at least two logical store areas, assigning to the first logical store area a segment from the free store if there is no store segment of sufficient size available;
   e) in the event of a store request regarding a second logical store area of the at least two logical store areas, assigning to the second logical store area a segment from the free store which has not been assigned to any other logical store area and which is adjacent to already assigned segments if no store segment of sufficient size is available;
   f) if it is no longer possible to satisfy a store request from a logical store area of the at least two logical store areas, which requires an assignment from the free store, since the free store has already been completely assigned, evaluating, via a store management of this store area, store managements of the other store areas to ascertain whether there are other segments in the other store areas with maximum size and, if this condition is met, takes over such other segment from a respective other store area and assigning said other segment to this store area; wherein an admissible segment size in the buddy algorithm is $2^k$ with the following condition for k: $5 \leq k \leq 16$.

2. The method as claimed in claim 1, wherein after clearing a logical store area, said logical store area is retained in its size.

3. The method as claimed in claim 1, wherein the computer system has a computer, and wherein if the computer provides store segment protection, those segments which are assigned to a logical store area are provided with protection.

4. The method as claimed in claim 3, wherein the computer is a microprocessor of at least a second generation type microprocessor.

5. The method as claimed in claim 1, wherein identifying features of the segments assigned from the free store are deposited in predetermined store areas.

6. The method as claimed in claim 5, wherein the identifying features are an initial address, a segment length and a type of access.

7. The method as claimed in claim 1, wherein the store areas provided are the Global Descriptor Table and the Local Descriptor Table of the microprocessor.

* * * * *